United States Patent [19]
Schobel et al.

[11] Patent Number: 4,824,681
[45] Date of Patent: Apr. 25, 1989

[54] ENCAPSULATED SWEETENER COMPOSITION FOR USE WITH CHEWING GUM AND EDIBLE PRODUCTS

[75] Inventors: Alexander M. Schobel, Whitehouse Station; Robert K. Yang, Randolph, both of N.J.

[73] Assignee: Warner-Lambert Company, Morris Plains, N.J.

[21] Appl. No.: 944,391

[22] Filed: Dec. 19, 1986

[51] Int. Cl.⁴ .................... A23L 1/236; A23G 3/30
[52] U.S. Cl. ........................... 426/5; 426/96; 426/548; 426/103; 426/658; 426/302; 424/48; 424/49
[58] Field of Search ............... 426/3, 5, 548, 94, 96, 426/658, 103, 302; 424/48, 49; 252/316

[56] References Cited

U.S. PATENT DOCUMENTS

| | | | |
|---|---|---|---|
| 3,104,205 | 9/1963 | Hainer et al. | 426/5 |
| 3,829,564 | 8/1974 | Merry et al. | 426/96 |
| 3,985,913 | 10/1976 | Johnson et al. | 426/96 |
| 4,230,687 | 10/1980 | Sair et al. | 426/548 |
| 4,384,004 | 5/1983 | Cea et al. | 426/3 |

Primary Examiner—Jeanette Hunter
Attorney, Agent, or Firm—Charles A. Gaglia, Jr.

[57] ABSTRACT

The present invention comprises the encapsulation of a sweetening agent in a coating material including a hydrophobic polymer and a hydrophobic plasticizer. The encapsulated sweetening agent is protected from deterioration due to moisture and provides controlled release of sweetener in products intended to be chewed during consumption.

72 Claims, No Drawings

ENCAPSULATED SWEETENER COMPOSITION FOR USE WITH CHEWING GUM AND EDIBLE PRODUCTS

BACKGROUND OF THE INVENTION

1. Field of the Invention

The present invention relates to the preparation of extended or delayed release sweeteners, and more particularly to the preparation of sweeteners in an encapsulated form suitable for incorporation in to food products which must be chewed such as chewing gums and chewable confections. The encapsulated sweeteners result in extended or prolonged release of sweetness in the food products and can also provide improved shelf stability for sweeteners such as L-aspartyl-L-phenylalanine and similar sweeteners which can be stabilized by an acidic environment.

2. Description of the Prior Act

Much effort has been directed to extending release of sweeteners and stabilizing sweeteners in food products and particularly in chewing gum compositions. Activity in this area has focused on dipeptide sweeteners such as L-aspartyl-L-phenylalanine methylester (aspartame). Aspartame has been widely recognized as an extremely good-tasting non-caloric sweetener for use in a variety of food products among which are chewing gum products. Unfortunately, aspartame is extremely unstable in the presence of moisture and undergoes hydrolytic degradation and subsequent loss of sweetness. Elevated temperatures and specific pH ranges may accelerate the hydrolytic degradation. Additionally, aspartame is known to react with a number of flavorings and chemicals such as aldehydes and ketones. For example, aspartame loses its sweetness due to chemical reactions in the presence of flavor aldehyde-containing oils such as cinnamon. These flavor oils are used in food products and are popular in chewing gum and other confectionery products. These compositions also generally contain moisture and may be exposed to elevated temperatures during their shelf-life. The result is the loss of aspartame and the corresponding loss of sweetness contributed thereby in the gum or food product.

Numerous attempts have been made to stabilize and extend sweetness release of aspartame and other sweeteners in chewing gums as well as other food products. U.S. Pat. No. 4,384,004 to T. Cea et al., discloses solid particles of aspartame encapsulated by a coating material selected from the group consisting of cellulose, cellulose derivatives, arabinogalactin, gum arabic, polyolefines, waxes, vinyl polymers, gelatin, zein and mixtures thereof, wherein the amount of said coating material to aspartame is from 1:1 to 1:10. More particularly, the coating materials include cellulose, methyl cellulose, ethyl cellulose, cellulose nitrate, cellulose acetate phthalate, carboxymethyl cellulose, hydroxyethyl cellulose, hydroxypropyl cellulose, arabinogalactan; polyethylene, polymethacrylates, polyamides, ethylenevinyl acetate copolymers, polyvinylpyrrolidone; gum arabic; paraffin wax, carnauba wax, spermaceti, beeswax; stearic acid, stearyl alcohol, glyceryl stearate; gelatin, zein and mixtures thereof.

The method of coating employed in this reference involves suspending the aspartame particles in a stream of air that passes through a zone of atomized liquid droplets of the coating material, so that the coating material is deposited on the surface of the aspartame. More than one coating may be used whereby the inner coating is water-soluble and the outer coating is water-insoluble.

U.S. Pat. Nos. 4,122,195 and 4,139,939, both to Bahoshy et al., fix aspartame by preparing it with a material such as gum arabic or the reaction product of a compound containing a polyvalent metallic ion, with an ungelatinized starch acid-ester of a substituted dicarboxylic acid, by a spray drying technique, where the aspartame and a film former are prepared in an emulsion.

U.S. Pat. No. 4,374,858, to Glass et al., discloses an aspartame sweetened chewing gum having improved sweetness stability wherein the chewing gum piece has aspartame coated on its surface, as opposed to incorporating it in the chewing gum mix.

EPA No. 81110320.0 published June 16, 1982 (Publication No. 0053844), to Ajinomoto Co., Inc. discloses a stabilized dipeptide-based sweetening composition comprising (a) from 20 to 60% by weight of solid fat, (b) from 10 to 30% by weight emulsifier, (c) from 10 to 30% by weight polysaccharide and (d) not more than 30% by weight of dipeptide sweetener. The compositions are prepared by heating the mixture of the ingredients, cooling, and pulverizing to obtain powder or granules of the composition to obtain a ASTM mesh size of smaller than 12. Spray drying the mixture is also disclosed.

U.S. Pat. No. 4,105,801 to Degliotti, discloses a confectionery comprising a core portion and shell adheringly enveloping the core portion, whereby the shell is formed by an intimate mixture of microcrystals of xylitol with a solid fatty substance to each 100 parts by weight of xylitol. The fatty substance is preferably a mono-, di- or triglyceride having a melting range of between 20° and 60° C.

U.S. Pat. No. 3,389,000 to Toyonaka et al., disclosed protective coatings for granular nucleoside-5-phosphates, the coatings being edible fats melting between 40°–100° C. and derived from plants and animals. Hydrogenated oils such as soybean oil, cottonseed oil, almond oil, castor oil, linseed oil, mustard oil, olive oil, grapefruit seed oil, palm oil, palm kernel oil, rapeseed oil, rice bran oil and the like and mixtures thereof. This reference discloses a process of preparing the granular product from a liquid mixture of fats and nucleoside-5-phosphates which are sprayed from a pressure nozzle and the resultant granules cooled and recovered.

U.S. Pat. No. 4,382,924, to Berling, discloses liquid oral dosage forms for vitamins or pharmaceutical materials comprising an edible oil, high potency lipid soluble sweetener such as saccharin and lipid soluble flavorant. The edible oil may be a polyol fatty acid ester having at least four fatty acid ester groups and each fatty acid having from about 8 to about 22 carbon atoms. The oil, sweetener and flavor oil are mixed and heated and then cooled to provide a palatable liquid dosage form.

For general discussion of spraying a fatty material onto sweeteners and the like see U.S. Pat. Nos. 3,949,094 and 3,976,794 both to Johnson, and U.S. Pat. No. 3,867,556 to Darragh. U.S. Pat. No. 4,293,572 to Silva et al., disclosed the application of a dispersion of an emulsified fat with a solution of dextrin, saccharin or a polysaccharide to a food product as a barrier against moisture. U.S. Pat. No. 3,527,647 discloses a process of agglomerating particles to cause them to collide and form agglomerates.

U.S. Pat. No. 4,597,970 to Sharma, et al., discloses a chewing gum composition comprising a gum base and agglomerated sweetener delivery system capable of effecting a controlled release of core material comprising:

(A) at least one natural or artificial core material selected from the group consisting of amino acid based sweeteners, dipeptide sweeteners, glycyrrhizin, saccharin and its salts, acesulfame salts, cyclamates, steviosides, talin, dihydrochalcone compounds, flavoring agents and mixtures thereof; and (B) a hydrophobic matrix consisting essentially of
 (i) lecithin; and
 (ii) an edible material having a melting point in the range of about 25° C. to about 100° C. selected from the group consisting of (a) fatty acids having an iodine value of about 1 to about 10, (b) natural waxes, (c) synthetic waxes and (d) mixtures thereof; and
 (iii) at least one glyceride.

PCT publication No. WO 84/0320 published Aug. 30, 1984 discloses a food-grade shellac encapsulant for active chewing gum ingredients. Encapsulation of sweetener, flavoring agent, food grade acid and pharmaceutical agents to achieve a gradual and controlled release of such ingredients is presented. The amount of shellac to sweetener such as aspartame is about 1:20 to about 0.9:1.

It is therefore desirable to develop a method for preparing sweeteners in a manner which extends sweetness of chewed edible products such as chewing gums and also increases the shelf stability of the dipeptide sweeteners such as aspartame when incorporated into these edible products.

SUMMARY OF THE INVENTION

The present invention includes in one aspect a chewing gum composition containing a sweetening agent encapsulated in a coating material comprising a hydrophobic polymer and a hydrophobic plasticizer. The amount of coating material to sweetening agent being about 3:1 to about 10:1.

The present invention also includes the encapsulated sweetening agent which is protected from deterioration due to moisture and provided with controlled release for use in a product intended to be chewed during consumption.

When used in a chewing gum composition, chewing gum sweeteners, both natural and artificial which are extracted from the chewing gum during mastication, have a prolonged release which can be controlled by manipulation of the formula used in the encapsulating composition. Consequently, sweetness perception can be extended for 20 to 30 minutes, which is a highly effective prolonged release effect. If a sweetening agent is included in the coating material, an extended long lasting sweetness perception can be achieved. If an acidifying agent is included in the coating material, the shelf life of dipeptide type sweeteners such as aspartame can be greatly extended.

For a better understanding of the present invention, and its scope, reference is made to the following description and appended claims.

DETAILED DESCRIPTION OF THE INVENTION

It has been unexpectedly discovered that the sweetness release from a chewing gum is significantly extended when a sweetening agent is encapsulated in a plasticized hydrophobic polymer.

In particular, an extended release sweetening composition has been unexpectedly discovered which comprises solid particles of a sweetening agent encapsulated by a coating material of a hydrophobic polymer, said hydrophobic polymer being characterized by
 (a) being water insoluble
 (b) having film forming capability,
 (c) being compatible with the sweetening agent, and
 (d) being edible; and
a hydrophobic plasticizer, wherein the amount of said coating material to said sweetening agent component is from about 3:1 to about 10:1.

Throughout the specification and the claims, the terms extended sweetener release and sustained sweetener release are used interchangeably and are defined as causing sweetness release to be continuous over a long period of time.

In another aspect of invention, a chewing gum having an extended sweetener release has been unexpectedly discovered which comprises a chewing gum base, and an extended release sweetener composition, said sweetener composition comprising solid particles of a sweetening agent encapsulated by a coating material of a hydrophobic polymer, said hydrophobic polymer being characterized by:
 (a) being water insoluble,
 (b) having film forming capability,
 (c) being compatible with the sweetening agent,
 (d) being edible; and
a hydrophobic plasticizer, wherein the amount of said coating material to said sweetening agent is from about 3:1 to about 10:1.

The gum base used in this invention may be any water-insoluble gum base well known in the art. Illustrative examples of suitable polymers in gum bases include without limitation substances of vegetable origin such as chicle, jelutong, guttapercha and crown gum; synthetic elastomers such as butadiene-styrene copolymer, isobutylene isoprene copolymer, polyethylene, polyisobutylene and polyvinylacetate and the like.

The amount of gum base employed will vary greatly depending on various factors such as the type of base used, consistency desired and other components used to make the final product. In general, amounts from about 5% to about 45% by weight of the final gum base composition are acceptable with preferred amounts of about 15% to about 30% by weight.

Plasticizers or softeners such as lanolin, stearic acid, sodium stearate, potassium stearate, glyceryl triacetate, glycerin and the like may also be incorporated into the gum base to obtain desirable texture and consistency properties. Such materials are generally employed in amounts up to about 30% by weight and preferably from about 3 to about 7% by weight of the final gum base composition.

The chewing gum of this invention may likewise contain additional conventional additives, including fillers such as calcium carbonate and talc; emulsifiers such as glyceryl monostearate and lecithin; coloring agents such as titanium dioxide and other conventional chewing gum additives known to one skilled in the chewing gum art.

The chewing gum composition of the present invention can also include additional other non-encapsulated sweeteners so that sequential release can be effected from the initial burst of sweetness throughout a desired time period.

Flavoring agents useful in the present invention include synthetic solid flavoring agents and/or liquids derived from plants, leaves, flowers, fruits and so forth and combinations thereof. Representative flavoring liquids include: spearmint oil, cinnamon oil, oil of wintergreen (methylsalicylate), peppermint oils, natural or synthetic fruit flavors such as citrus oil, including lemon, orange, grape, lime and grapefruit, fruit essences including apple, strawberry, cherry and pineapple can be used.

The amount of flavoring agent employed is normally a matter of preference subject to factors such as flavor type, base type and strength. In general, amounts of 0.5% to about 3% by weight are used in chewing gum compositions with preferred amounts being from about 0.3% to about 1.5%, the most preferred ranges being from 0.7 to about 1.2%.

The inventive sweetener composition can be added to conventional chewing gum compositions in amounts of about 0.2% to about 8% by weight of the final chewing gum composition and preferable in amounts of about 1% to about 5% and most preferably in amounts of about 1% to about 3% by weight. It is no way critical to the instant invention which conventional chewing gum composition is used with the novel sweetening composition and such a determination can be made by routine experimentation and choice as to the particular formulation desired.

The chewing gum may also comprise a sweet, water-soluble bulking agent although non-caloric or low-calorie gums can be prepared using no bulking agents or bulking agents which have little or no assimilatable caloric value. For sugar gums, the bulking agent may consist of dextrose, sucrose, maltose, dextrin, dried invert sugar, fructose, lactose, galactose, corn syrup or corn syrup solids, or combinations thereof. For sugarless gums, the bulking agent may comprise polydextrose (a low-calorie carbohydrate manufactured by Pfizer) or a sugar alcohol such as sorbitol, mannitol, xylitol or combinations thereof. Such bulking agents are present in an amount ranging from about 30% to about 80% by weight of the entire chewing gum composition.

The chewing gum can be manufactured in a conventional manner. First, the base is heated from about 70° C. to about 120° C. and placed into a mixer. If coloring is desired, it may be added at this point, followed by the bulking agent, if any, the encapsulated sweetening agent or agents, the gum plasticizing agent and flavoring agent. When the chewing gum is removed from the mixer, the mixture is rolled or extruded, cut into individual pieces, cooled and then wrapped in a known manner.

Sweetening agents useful in the present invention may be selected from a wide range of materials such as water-soluble sweetening agents, water-soluble artificial sweeteners, and dipeptide based sweeteners, including mixtures thereof. Without being limited to particular sweeteners, the terms "sweetening agent" and "sweetener" are used interchangeably throughout the description and the claims. Representative illustrations encompass:

A. Water-soluble sweetening agents such as monosaccharides, disaccharides and polysaccharides such as xylose, ribose, glucose, mannose, galactose, fructose, dextrose, sucrose, lactose, maltose, partially hydrolyzed starch, and corn syrup solids and sugar alcohols such as sorbitol, galactitol, maltitol, lactitol, xylitol, mannitol and mixtures thereof.

B. Water-soluble artificial sweeteners such as the soluble saccharin salts, i.e. sodium or calcium saccharin salts, cyclamate salts, acesulfame salts and the like the free acid form of saccharin dihydrochalcone, glycyrrhizin, steviosides, talin and acesulfame.

C. Dipeptide based sweeteners include L-aspartyl-L-phenylalanine methylester and materials described in U.S. Pat. No. 3,492,131 and the like.

The sweetening agents may be encapsulated singly or in mixtures of sweetening agents. While particle size of the sweetener to be encapsulated is not crtial, it is preferred that the particle size be from about 300 microns to about 150 microns and most preferably about 250 microns to about 180 microns.

The sweetening agent may be granulated, that is mixed with a binding agent, to cause agglomeration of the sweetening agent particles thus forming larger particles. These particles can then be milled or screened to the preferred particle size range before coating. Particles of sweetening agent having a particle size less than 100 microns are difficult to handle during the coating process.

When a sweetening agent is granulated to form a granulation, the particle size of the granulation will be about 300 microns to about 150 microns, preferably about 250 microns to about 180 microns.

A granulating agent may be added to the sweetening agent in an amount up to about 10% by weight of the sweetening agent. Preferably the granulating agent will be present in an amount of about 2% to about 6% and most preferably about 3 to about 5%. The combination of granulating agent and sweetening agent will be termed a sweetening component throughout this specification and claims.

Granulating materials useful in the present invention are those water soluble, nontoxic, edible polymeric materials capable of causing agglomeration or aggregation of the sweetening agent particles. Illustrative granulating agents are natural gums, modified gums, modified celluloses and the like. Granulating agents may be used alone or in mixtures.

Preferred granulating agents are hydrocolloids, more commonly referred to as "gums". Hydrocolloids are long-chain, high-molecular weight polymers that disperse and hydrate in water to give a thickening and sometimes a gelling effect. Both natural and synthetic hydrocolloids are useful in the present invention. Natural gums are derived from various plant and animal sources. Illustrative, non-limiting examples of natural hydrocolloids suitable for use in the present invention include: plant exudates such as arabic, tragacanth, karaya, ghatti; seaweed extracts such as agar, alginates, carrageenans, furcellaran; plant seed gums such as guar, locust bean, psyllium, quince, tamarind; non fermentable cereal gums such as corn hull gum; plant extracts such as pectin, arabinogalactan; and fermentation gums such as dextran, xanthan and curdlan. Synthetic hydrocolloids or synthetic gums are gum-like chemically synthesized polymers having no structural relationships to natural gums. Illustrative non-limiting examples of synthetic hydrocolloids suitable for use in the present invention include: polyvinylpyrrolidone, carboxyvinyl polymers, and polyethylene oxide polymers.

Modified celluloses may also be utilized as granulating agents. Modified celluloses also called cellulose gums are prepared from purified cellulose by first swelling the cellulose fibers with sodium hydroxide and then by chemically substituting exposed hydroxyl groups. Through this process, a variety of substituted celluloses have been prepared which are soluble in water and are capable of gellation.

Water soluble modified celluloses suitable for use in the present invention include: methylcellulose, hydroxypropylmethylcellulose, carboxymethylcellulose, hydroxypropylcellulose, methylethylcellulose, hydroxyethylcellulose and mixtures thereof. A preferred modified cellulose is hydroxypropyl methylcellulose.

The coating material is formed from a hydrophobic polymer and a hydrophobic plasticizer.

Hydrophobic polymers useful in the present invention have the following characteristics:
(a) being water insoluble,
(b) having film forming capability
(c) being compatible with the sweetening agent, and
(d) being edible The hydrophobic polymer of this invention is selected form the group consisting of phthalic acid esters, polyvinyl acetate phthalate, cellulose acetate phthalate, methacrylic acid esters, cellulose ethers, polyethylene oxide polymers, ethylcellulose, shellac and mixtures thereof. A particularly preferred hydrophobic polymer useful in this invention is ethylcellulose.

Water insolubility of the hyrophobic polymer is essential to prevent the coating from being eroded away by saliva during mastication and to form a moisture impermeable barrier to protect the sweetener from its environment during storage. The hydrophobic polymer is present in an amount of about 55% to about 95% by weight of the coating composition solids preferable about 60% to about 80%.

The hydrophobic plasticizer of the present invention must be water insoluble, edible and compatible with the sweetening agent. Useful plasticizers include dibutyl sebacate, acetyl tributyl citrate, diethyl phthalate, acetylated mono and diglycerides and the like and mixtures thereof. A particularly preferred plasticizer is dibutyl sebacate.

The plasticizer functions as solvent for the polymer, softening it and combining with the polymer to form a film that is pliable and capable of sealing the sharp edges of crystalline sweeteners. In the absence of plasticizer, the polymer films would be rigid and fracture easily thereby exposing encapsulated sweeteners to the environment.

The plasticizer is present in an amount of about 5% to about 40%, preferably about 10% to about 30% by weight of the coating material. Plasticizer content of less than about 5% will cause a brittle film to form which would crack and peel. Plasticizer content greater than 40% will cause the encapsulating will cause excessive tackyness.

The coating material may further comprise a sweetening agent in an amount up to about 5% by weight of the coating material. Preferably the sweetening agent will be present in an amount of about 0.3% to about 5% and most preferably about 0.5% to about 1.5% by weight of the coating material.

The sweetening agent in the coating material enhances the overall sweetness of the composition. The sweetening agents are selected from the same group of sweetening agents being encapsulated but may, however, be a different sweetener or a mixture of sweeteners. A particularly preferred sweetening composition is prepared when the encapsulated sweetener is aspartame and the sweetener in the coating material is saccharin. This combination is known to act synergistically to enhance sweetness.

The coating material may further comprise a nontoxic water soluble acidifying agent. The acidifying acid will act as a flavor enhancer or flavorant. In addition, the acidifying agent has been unexpectedly found to stabilize dipeptide sweeteners such as aspartame. This unexpected increased stabilization has permitted the preparation of chewing gum compositions sweetened with aspartame to have a stable shelf life greater than one year and to have a sustained sweetness release lasting up to 30 minutes.

Acidifying agents suitable for use in the present invention include but are not limited to citric acid, tartaric acid, malic acid, ascorbic acid, sorbic acid, lactic acid, fumaric acid, acesulfame, saccharin and mixtures thereof.

A particularly preferred acidifying agent is saccharin. Saccharin has the ability to both acidify and sweeten.

The acidifying agent is present in an amount up to about 5% by weight of the coating material, preferably about 0.3 to about 5% and most preferably about 0.5 to about 1.5.

The combined amount of sweetening agent and acidifying agent in the coating material is up to about 5% by weight of the coating material solids. Greater than about 5% of these water soluble compounds will weaken the coating material causing it to be less water impermeable.

A sweetening component is prepared by dissolving while mixing at low shear a water soluble granulating agent in sufficient suitable unreactive solvent to form a granulating solution comprising about 2% to about 10% granulating agent. The solvent is preferably water, alcohol and mixtures thereof.

The granulating solution is then added to the sweetening agent and mixed slowly until a uniformly wet mass is formed. The wet mass is dried and sized.

Though the ratio of the quantity of the coating materials or encapsulating agents to the sweetener may vary, it is possible to successfully coat and stabilize the sweetener with about a 3:1 ratio of coating material to sweetener. Ratios of coating material to sweetener may range from about 3:1 to about 10:1 and in a particular embodiment, may range from about 4:1 to 8:1. Sweetener particles may be encapsulated by more than one layer of the coating materials, in accordance with the coating process described hereinafter. In a further embodiment, the sweetener particles may be coated by plural diverse coating materials, disposed either in mixture with each other or in discrete layers. In the latter instance, for example, the sweetener may be initially coated with an acidified coating material after which a neutral or sweetener containing coating material may be deposited thereover. The advantage of this sequence is to extend the protection of the sweetener from premature exposure to water and the resultant early release of sweetener or loss of unstable sweeteners.

The present method of preparing the sweetening composition comprises encapsulating the sweetening agent or sweetening component with the coating materials within the parameters set forth above. Sweetening agent or sweetening component may be encapsulated by a variety of coating techniques, including spray drying, coacervation, and the like. Preferably, the sweetening agent or sweetening component is encapsulated by a method that operates in a similar fashion to fluidized bed coating processes, in which particles of sweetening agent or sweetening component are suspended in an apparatus that creates a strong upward air current or stream in which the particles move. The stream passes through a zone of finely atomized droplets of the coating material or encapsulant, after which the coated particles pass out of the upward stream and pass downward in a fluidized condition countercurrent to a flow of heated fluidized gas whereupon they are dried, and may re-enter the upward-moving coating zone for a subsequent discrete coating application. The foregoing method and associated apparatus are known as the Wurster Process. The Wurster Process and its associated apparatus are set forth in detail in the following U.S. Patents, disclosures of which are incorporated herein by reference: U.S. Pat. Nos. 3,089,824; 3,117,027; 3,196,827; 3,241,520; and 3,253,944.

One of the advantages of the present method is that it may be conducted at temperatures that are reduced from those utilized in prior art encapsulation processes. In particular, the present process may operate at inlet temperatures in the order of about 40° C. to about 80° C., so that relatively mild heating of the sweetening agent, takes place while the coating material is disposed thereon. The temperature may vary up to the decomposition point of the sweetening agent and for example, may range as high as 95° C. The selection of a particular temperature within the aforementioned range is therefore contemplated within the scope of the present invention.

The coating material is prepared for use in the present encapsulation method by the formation of a liquid capable of being uniformly atomized. In particular, a solution, dispersion or emulsion of the coating materials in respective solvents may be prepared, depending upon the nature of the coating material. For example a, water-insoluble coating material or materials are prepared with appropriate organic solvents such as acetone, lower alcohols such as isopropyl alcohol, methanol, ethanol and the like.

The water insoluble materials may also be applied in an aqueous dispersion wherein the solids content is about 25% to about 1% by weight of the emulsion preferably about 10% to about 3%. In a particularly preferred embodiment, the coating material comprises an ethylcellulose latex emulsion and a plasticizer wherein the plasticizer is preferably dibutyl sebacate wherein the total solids content is about 7% to about 0.8% by weight of the coating material emulsion. A particularly preferred ethycellulose is an aqueous dispersion of about 30% solids, known as Aquacoat®, and supplied by FMC.

A dispersing aid may be incorporated into the aqueous emulsion. The dispersing aid is a non-water soluble particulate material. The dispersing aid helps prevent the agglomeration of sweetener substrate particles during the coating process, thus facilitating an even and dicrete polymeric coat of the sweetener particles.

The dispersing aid useful in the present invention is selected from the group consisting of talc, titanium dioxide, aluminum oxide, magnesium oxide, calcium phosphate, calcium carbonate and the like and mixtures thereof. The dispersing aid is present in an amount of up to about 1% by weight of the coating material preferably about 0.01% to about 0.5%.

Particle size of the dispersing aid is critical and is in the range of about 50 microns to about 150 microns. Particles larger than 150 microns may initiate agglomeration of the dispersion causing coating equipment clogging and uneven coating. Preferably the dispersing aid will have a particle size of about 75 microns to about 60 microns.

The encapsulated sweeteners of this invention release sweetness at a controlled rate throughout the duration of chewing rather than in only the initial few minutes. This continuous release, in the case of saccharin, reduces and conceals its bitter aftertaste even at high concentration. Furthermore, the encapsulated sweetener aspartame when encapsulated according to the present invention will not undergo degradation and lose its sweetness during aging. Thus, by the use of the present coating material, prepared and coated on sweeteners which are then included into chewing gum, a sustained sweetness perception can be imparted to the chewing gum product while moisture deterioration problems such as those experienced by aspartame are significantly reduced.

Examples have been prepared in accordance with the present invention to provide chewing gums having longer-lasting sweetness impact, these examples have compositions including chewable gum base, flavor and sweetener in an amount sufficient to impart normally accepted sweetness to the gum, and an amount of encapsulated artificial sweetener including saccharin and L-aspartyl-L-phenylalanine methylester (APM) effective to produce longer-lasting sweetness in the gum. The chewing gum composition can be either sugar-containing or sugarless. The chewing gum compositions can be anhydrous or contain water. The present invention is further illustrated by the following examples. All parts and percentages in the examples and throughout the specification and claims are by total weight of the composition unless otherwise indicated.

EXAMPLE 1

(Inventive Runs IA and IB)

Encapsulated aspartame was prepared by first granulating the aspartame.

Granulating sweetener: Disperse HPMC in ethanol at moderate shear, slowly add water and mix until a smooth solution develops. Slowly add the solution to the powder sweetener and mix slowly until a uniform wet mix is formed. Pass the wet mix through a #20 mesh U.S. Standard screen, and oven dry at about 60° C. for about 0.5 hours. After drying, screen the particulates through a #20 mesh U.S. Standard screen and retain on a #60 mesh U.S. Standard screen. This forms the sweetener granules.

Two granulations were prepared by the above procedure.

| | Granulation | | | |
| | IA | | IB | |
| Ingredient | wt. (g) | % of dry WT | Wt. (g) | % of dry WT. |
| Aspartame | 200.0 | 96.2 | 200.0 | 94.3 |
| Ethanol (100%) | 157.0 | — | 80.0 | — |
| HPMC | 8.0 | 3.8 | 12.0 | 5.7 |
| Water | 20.0 | — | — | — |
| Total (Dry WT) | 208.0 | 100.0 | 212.0 | 100.0 |

HPMC = hydroxypropylmethycelluse

Coating:
Add plasticizer to aqueous emulsion of hydrophobic polymer and mix for about 20 minutes until plasticizer is uniformly dispersed in the emulsion. Add sweetener and water to the mixture and continue mixing for about 10 minutes or until uniform. Charge a Strea-1 (Aeromatic) coating machine with the sweetener granules and apply coating. Both granulations IA and IB above were coated using the following parameters.

| Ingredient | IA WT/VOL | IB WT/VOL |
|---|---|---|
| COATING | | |
| Ethylecellulose latex aqueous mulsion (Aquacoat ®) | | |
| (30% solids) | 2600 ml | 2600 ml |
| Sweetener (saccharin) | 10 g | 12 g |
| Plasticizer (dibutyl sebacate) | 156 g | 174 g |
| WATER q.s. to | 4500 ml | 4500 ml |
| COATING PARAMETERS FOR IA AND IB | | |
| Charge Weight (sweetener granules) | 150.0 g | |
| Tubing | Silicone ID. 0.63 in. OD. 0.192 in. | |
| Top Screen (Nylon) | 270 Micron | |
| Bottom Screen (Steel) | 170 Micron | |
| Nozzle | 1.10 mm | |
| Fan Setting | 5.0–9.5 | |
| Atomizing Air (psi) | 0.40–0.60 | |
| Air Inlet Temp | 60° C. | |
| Air Outlet Temp | 28–30° C. | |
| Flow Rate (ml/min) | 1.75–3.5 | |

EXAMPLE 2

(Inventive Run II)

A granulation was prepared by the procedure of Example I.A. the granulation was then coated by the coating procedure of Example 1 utilizing the following ingredients.

| COATING INGREDIENT | II (WT/Vol) |
|---|---|
| Ethylcellulos latex aqueous emulsion 30% solids (Aquacoat ®, FMC) | 3176 ml |
| Sweetener (saccharin) | 22 g |
| Plasticizer (dibutyl sebacate) | 191 g |
| Water q.s. to | 5500 ml |

Product recovered from Example 2 was found to contain 11% Aspartame. The ratio of coating to Aspartame is 8.1 to 1.

EXAMPLES 3–6

Using the encapsulated sweeteners made in Examples 1 and 2, chewing gum product samples were prepared as shown in Table 1.

TABLE I

| | Chewing Gum Compositions | | | | |
|---|---|---|---|---|---|
| | | Parts by Weight | | | |
| Ingredients | Control | Ex. 3 | Ex. 4 | Ex. 5 | Ex. 6 |
| Gum base | 26.4 | 26.4 | 26.4 | 26.4 | 26.4 |
| Triacetin | 1.3 | 1.5 | 1.5 | 1.3 | — |
| Sorbitol | 70.8 | 69.2 | 68.2 | 69.4 | — |
| Sugar 6X | — | — | — | — | 62.7 |
| Peppermint Oil | 1.2 | 1.2 | 1.2 | — | 1.2 |
| Cinnamon Oil | — | — | — | 1.2 | — |
| Ex. 1A Encap. APM* | — | 1.7 | — | 1.7 | 1.7 |
| Ex. 2 Encap. APM* | — | — | 2.7 | — | — |
| Free APM | 0.3 | — | — | — | — |

TABLE I-continued

| | Chewing Gum Compositions | | | | |
|---|---|---|---|---|---|
| | | Parts by Weight | | | |
| Ingredients | Control | Ex. 3 | Ex. 4 | Ex. 5 | Ex. 6 |
| H₂O | — | — | — | — | 8.0 |

*APM = Aspartame

The above compositions were prepared by adding the sugar or sorbitol and encapsulated sweetener at approximately the same time under mechanical stirring and and in the absence of added heat for five minutes. The molten gum base along with the softener, previously melted at approximately 95° C., were transferred into the mixer and mixed for three minutes. The finished gum product was rolled and scored.

In order to evaluate the stability of the encapsulated Aspartame in chewing gums as in Examples 3, 4, 5 and 6, a control batch with free Aspartame was also prepared. These batches were subjected to observation at room temperature over a period of at least 50 weeks or more. The results are set forth in Table II below:

TABLE II

| Stability of Encapsulated Aspartame in Chewing Gum Aspartame PPM | | | | | | |
|---|---|---|---|---|---|---|
| Example No. | Initial | 2 Wks. | 3 Wks. | 8 Wks. | 50 Wks. | 65 Wks. |
| Control | 2750 | 1400 | — | 750 | 250 | — |
| #3 | 2900 | — | 2890 | 2750 | 2660 | 2640 |
| #4 | 2885 | — | 2900 | 2825 | 2610 | 2610 |
| #5 | 2950 | 2875 | 2860 | 2700 | 2450 | 2410 |
| #6 | 2930 | 2910 | 2915 | 2905 | 2610 | 2585 |

The results given in Table II clearly indicate a superior performance for the product made by using the present invention.

The chewing gums prepared in accordance with the invention have been found to retain discernible sweetness perception for as long as 30 minutes of continuous chewing. Encapsulated Aspartame, prepared in accordance with the present invention, when incorporated into hydrous chewing gum formulations has been found to exhibit excellent stability. When stored at about 20° C. (room temperature) for 65 weeks, the gum products were found to retain over 80% of their initial Aspartame Content.

Furthermore, the chewing gums prepared in accordance with the invention have been found to retain discernible sweetness perception for as long as 30 minutes of continuous chewing.

This invention being thus described, it will be obvious that the same may be varied in many ways. Such variations are not to be regarded as a departure from the spirit and scope of the invention and all such modifications are intended to be included within the scope of the following claims.

We claim:

1. An extended release sweetener composition comprising:
    solid particles of a sweetening agent encapsulated by a coating material of a hydrophobic polymer, said hydrophobic polymer being characterized by:
    (a) being water insoluble,
    (b) having film forming capability,
    (c) being compatible with the sweetening, agent, and
    (d) being edible; and a hydrophobic plasticizer, wherein the amount of said coating material to said sweetening component is from about 3:1 to about 10:1.

2. The composition of claim 1, wherein the sweetening agent further comprises a granulating agent in an amount up to about 10% by weight of the sweetening agent.

3. The composition of claim 1 wherein said hydrophobic polymer is selected from the group consisting of ethylcellulose; phthalic acid esters, shellac, methacrylic acid esters, cellulose ethers, polyethylene oxide polymers, polyvinyl acetate phthalate, cellulose acetate phthalate, and mixtures thereof.

4. The composition of claim 1, wherein the plasticizer is characterized by being water insoluble, being edible, and being compatible with the sweetening agent.

5. The composition of claim 1, wherein the plasticizer is selected from the group consisting of dibutyl sebacate, diethyl phthalate, acetyltributyl citrate, acetylated mono and diglycerides and mixtures thereof.

6. The composition of claim 1, wherein said particles are encapsulated by the deposition of atomized droplets of at least one layer of said coating material thereon.

7. The composition of claim 1, wherein the amount of said coating material to said sweetener component is from about 5:1 to about 7:1.

8. The composition of claim 1, wherein said sweetening agent is selected from the group consisting of natural sweeteners, artificial sweeteners and mixtures thereof.

9. The composition of claim 8, wherein the sweetening agent is selected from the group consisting of sucrose, glucose, fructose, lactose, saccharin and its salts, cyclamic acid and its salts, aspartame, dihydrochalcone, glycyrrhizin, steviosides, acesulfame and its salts, talin, sorbitol, galactitol, maltitol, lactitol, xylitol, mannitol and mixtures thereof.

10. The composition of claim 1, wherein the coating material further comprises a sweetening agent.

11. The composition of claim 10, wherein the sweetening agent is selected from the group consisting of sucrose, glucose, fructose, lactose, saccharin and its salts, cyclamic acid and its salts, aspartame, dihydrochalcone, glycyrrhizin, steviosides, acesulfame and its salts, talin, sorbitol, galactitol, maltitol, lactitol, xylitol, mannitol and mixtures thereof.

12. The composition of claim 10, wherein the sweetening agent is present in an amount up to about 5% by weight of the coating material solids.

13. The composition of claim 1 wherein the coating material comprises the hydrophobic polymer present in an amount of about 55% to about 95%, and the hydrophobic plasticizer present in an amount of about 5% to about 40% all percents are by weight of the coating material solids.

14. The composition of claim 1, wherein the coating material further comprises a dispersing aid.

15. The composition of claim 14, wherein the dispersing aid is selected from the group consisting of talc, magnesium oxide, aluminum oxide, titanium dioxide, calcium carbonate, calcium phosphate and mixtures thereof.

16. The composition of claim 14, wherein the dispersing aid is present in an amount of up to about 1% by weight of the coating material solids and has a particle size of about 150 microns to about 50 microns.

17. The composition of claim 1, wherein the sweetening agent has a particle size of about 150 microns to about 300 microns.

18. The composition of claim 2, wherein the granulating agent is selected from the group consisting of the natural hydrocolloids; arabic, tragacanth, karaya, ghatti, agar, alginates, carrageenans, furcellaran, guar, locust bean, psyllium, quince, tamarind, corn hull gum, pectin, arabinogalactan, dextran, xanthan, curdlan, polyvinylpyrrolidone, carboxyvinyl polymers, polyethylene oxide polymers, methylcellulose, hydroxypropylcellulose, hydroxypropylmethylcellulose, carboxymethylcellulose, methylethylcellulose, hydroxyethylcellulose and mixtures thereof.

19. The composition of claim 2, wherein the granulating agent is present in an amount from about 2% to about 6% by weight of the sweetening agent.

20. The composition of claim 1, wherein the coating material further comprises an acidifying agent.

21. The composiotion of claim 20, wherein the acidifying agent is selected from the group consisting of saccharin, acesulfame, citric acid, ascorbic acid, sorbic acid, fumaric acid, malic acid, tartaric acid, lactic acid and mixtures thereof.

22. The composition of claim 20, wherein the acidifying agent is present in an amount up to about 5% by weight of the coating material solids.

23. The composition of claim 1, wherein the composition is a solid having an average particle size of about 600 microns to about 210 microns.

24. The composition of claim 1, wherein the hydrophobic polymer is ethylcellulose.

25. A method for preparing an extended release sweetener composition comprising:
encapsulating particles of a sweetening agent in a coating material of, a hydrophobic polymer, said hydrophobic polymer being characterized by:
(a) being water insoluble,
(b) having film forming capability,
(c) being compatible with the sweetening component,
(d) being edible;
a hydrophobic plastizer, wherein, the amount of said coating material to said sweetening agent is from about 3:1 to about 10:1, wherein said sweetening agent is encapsulated by the deposition of the coating material.

26. The method of claim 25, wherein the deposition the coating material is conducted at a temperature ranging from about 40° C. to about 95° C.

27. The method of claim 25, further comprising recovering the encapsulated particles.

28. The method of claim 25, wherein the coating material is an aqueous emulsion.

29. The method of claim 25, wherein the coating material is an aqueous emulsion comprising from about 1% to about 25% solids by weight of the emulsion.

30. The method of claim 29, wherein the aqueous emulsion comprises solids in an amount of about 3% to about 10% by weight of emulsion.

31. The method of claim 25, wherein plural layers of said coating material are deposited upon said particles.

32. The method of claim 35, wherein said particles are encapsulated by the deposition of atomized droplets of at least one layer of said coating material thereon.

33. The method of claim 25, wherein plural coating materials are utilized.

34. The method of claim 33, wherein said plural coating materials are mixed with each other prior to deposition upon said particles.

35. The method of claim 33, wherein said plural coating materials are deposited separately and sequentially upon said particles.

36. The method of claim 32, wherein said deposition is performed by conducting said particles in a stream of air passing through a zone of said atomized droplets.

37. An acid stabilized sweetener composition comprising:
solid particles of a sweetening agent encapsulated by a coating material of an acidifying agent, a hydrophobic polymer, said hydrophobic polymer being characterized by:
(a) being water insoluble
(b) having film forming capability,
(c) being compatible with the acidifying agent and the sweetening agent,
(d) being edible; and
a hydrophobic plastizer, wherein the amount of said coating material to said sweetening agent is from about 3:1 to about 10:1.

38. The composition of claim 37, wherein the sweetening agent further comprises a granulating agent in an amount up to about 10% by weight of the sweetening agent.

39. The composition of claim 37, wherein the sweetening agent is L-aspartyl-L-phenylalanine methyl ester.

40. The composition of claim 37, wherein the acidifying agent is an edible material, and forms an acidic solution with water.

41. The composition of claim 37, wherein the acidifying agent is selected from the group consisting of: saccharin, acesulfame, citric acid, ascorbic acid, sorbic acid, fumaric acid, malic acid, tartaric acid, lactic acid and mixtures thereof.

42. The composition of claim 35, wherein the acidifying agent is present in an amount of about 0.3% to about 5% by weight of the coating material solids.

43. The composition of claim 37, wherein the acidifying agent is present in an amount of about 0.5% to about 1.5% by weight of the coating material solids.

44. The composition of claim 37 wherein said hydrophobic polymer is selected from the group consisting of ethylcellulose; phthalic acid esters, shellac, methacrylic acid ethers, cellulose esters, polyethylene oxide polymers, polyvinyl acetate phthalate, cellulose acetate phthalate, and mixtures thereof.

45. The composition of claim 37, wherein the plasticizer is characterized by being water insoluble, being edible, being compatible with the sweetening agents.

46. The composition of claim 37, wherein the plasticizer is selected from the group consisting of dibutyl sebacate, diethyl phthalate, acetyltributyl citrate, acetylated mono and diglycerides and mixtures thereof.

47. The composition of claim 37, wherein said particles are encapsulated by the deposition of atomized droplets of at least one layer of said coating material thereon.

48. The composition of claim 37, wherein the amount of said coating material to said sweetening agent is from about 5:1 to about 7:1.

49. The composition of claim 37, wherein said sweetening agent is selected from the group consisting of natural sweeteners, artificial sweeteners and mixtures thereof.

50. The composition of claim 49, wherein the sweetening agent is selected from the group consisting of sucrose, glucose, fructose, saccharin and its salts, cyclamic acid and its salts, aspartame, dihydrochalcone, glycyrrhizin, steviosides, acesulfame and its salts, talin, sorbitol, galactitol, maltitol, lactitol, xylitol, mannitol and mixtures thereof.

51. The composition of claim 37, wherein the coating material comprises the hydrophobic polymer present in an amount of about 55% to about 95%, the sweetening agent present in an amount of about 0.3% to about 5%, the hydrophobic plasticizer present in an amount of about 5% to about 40% all percents are by weight of the coating material solids.

52. The compositon of claim 37 wherein the coating material further comprises a dispersing aid.

53. The composition of claim 52, wherein the dispersing aid is selected from the group consisting of talc, magnesium oxide, titanium dioxide, calcium carbonate, calcium phosphate and mixtures thereof.

54. The composition of claim 52, wherein the dispersing aid is present in an amount of about 0.01% to about 1% by weight of the coating material solids and has a particle size of about 150 microns to about 50 microns.

55. The composition of claim 37, wherein the sweetening agent has a particle size of about 150 microns to about 300 microns.

56. The composition of claim 38, wherein the granulating agent is selected from the group consisting of the natural hydrocolloids; arabic, tragacanth, karaya, ghatti, agar, alginates, carrageenans, furcellaran, guar, locust bean, psyllium, quince, tamarind, corn hull gum, pectin, arabinogalactan, dextran, xanthan, curdlan, polyvinylpyrrolidone, carboxvinyl polymers, polyethylene oxide polymers, methylcellulose, hydroxypropylcellulose, methylethylcellulose, hydroxyethylcellulose and mixtures thereof.

57. The composition of claim 38, wherein the granulating agent is present in an amount from about 2% to about 6% by weight of the sweetening compound.

58. The composition of claim 37, wherein the sweetening compound has a particle size of abut 150 microns to about 300 microns.

59. The composition of claim 37, wherein the coating material is an aqueous emulsion further comprising from about 1% to about 25% solids by weight of the coating material.

60. The composition of claim 59, wherein the solids are present in an amount of about 3% to about 10% by weight of the emulsion.

61. A method for preparing an acid stabilized sweetener composition comprising:
encapsulating particles of an acid stabilized sweetening agent in a coating material of an acidifying agent, a hydrophobic polymer, said hydrophobic polymer being characterized by:
(a) being water insoluble,
(b) having film forming capability,
(c) being compatible with the sweetening agent and the acidifying agent,
(d) being edible; and
a hydrophobic plasticizer, wherein the amount of said coating material to said sweetening component is from about 3:1 to about 10:1, wherein said sweetener component is encapsulated by the deposition of the coating material.

62. The method of claim 61, wherein the deposition of the coating material is conducted at a temperature ranging from about 40° C. to about 95° C.

63. The method of claim 61 further comprising recovering the encapsulated particles.

64. The method of claim 61, wherein the coating material is an aqueous emulsion.

65. The method of claim 61, wherein the coating material is an aqueous emulsion comprising about 1% water to abourt 25% solids by weight of the emulsion.

66. The method of claim 65 wherein the solids are present in an amount of about 3% to about 10% by weight of the coating material.

67. The method of claim 61, wherein plural layers of said coating material are deposited upon said particles.

68. The method of claim 61, wherein said particles are encapsulated by the deposition of atomized droplets of at least one layer of said coating material thereon.

69. The method of claim 61, wherein plural coating materials are utilized.

70. The method of claim 69, wherein said plural coating materials are mixed with each other prior to deposition upon said particles.

71. The method of claim 69, wherein said plural coating materials are deposited separately and sequentially upon said particles.

72. The method of claim 68, wherein said deposition is performed by conducting said particles in a stream of air passing through a zone of said atomized droplets.

* * * * *